(12) United States Patent
Taylor

(10) Patent No.: US 9,586,278 B2
(45) Date of Patent: Mar. 7, 2017

(54) BOLT CLEANING APPARATUS

(71) Applicant: Gary Howard Taylor, Fairbanks, AK (US)

(72) Inventor: Gary Howard Taylor, Fairbanks, AK (US)

(*) Notice: Subject to any disclaimer, the term of this patent is extended or adjusted under 35 U.S.C. 154(b) by 391 days.

(21) Appl. No.: 14/181,230

(22) Filed: Feb. 14, 2014

(65) Prior Publication Data

US 2015/0231715 A1 Aug. 20, 2015

(51) Int. Cl.
*B08B 9/023* (2006.01)
*B23G 9/00* (2006.01)
*B24D 13/10* (2006.01)
*B24D 15/04* (2006.01)

(52) U.S. Cl.
CPC .............. *B23G 9/009* (2013.01); *B08B 9/023* (2013.01); *B24D 13/10* (2013.01); *B24D 15/04* (2013.01); *A46B 2200/3073* (2013.01)

(58) Field of Classification Search
CPC .......... A46B 13/02; B08B 9/023; B23G 9/009
See application file for complete search history.

(56) References Cited

U.S. PATENT DOCUMENTS

| 2,404,507 | A | 7/1946 | Link |
| 2,600,338 | A | 6/1952 | Starr |
| 2,927,336 | A | 3/1960 | Sauer |
| 6,735,805 | B2 | 5/2004 | Chapin |
| 2004/0031112 | A1* | 2/2004 | Saurer .................. A46B 13/001 15/88 |
| 2004/0086348 | A1* | 5/2004 | Rahberger ............. B23G 9/009 408/215 |
| 2006/0112506 | A1 | 6/2006 | Smart et al. |
| 2012/0186032 | A1* | 7/2012 | Donohue ............... B23G 9/009 15/93.1 |

OTHER PUBLICATIONS

International Search Report and Written Opinion of the International Search Authority in International Application No. PCT/US2015/015267, mailed May 18, 2015.

* cited by examiner

*Primary Examiner* — Randall Chin
(74) *Attorney, Agent, or Firm* — Davis Wright Tremaine LLP; George C. Rondeau, Jr.; Heather M. Colburn

(57) ABSTRACT

An apparatus for cleaning a bolt having a threaded portion with a longitudinal axis of rotation. The apparatus includes a bolt receiving portion and a cleaning member. The bolt receiving portion has a throughway configured to receive the threaded portion of the bolt when the threaded portion is rotating about the longitudinal axis of rotation. The cleaning member is coupled to the bolt receiving portion and has a plurality of cleaning projections positioned to contact and clean the threaded portion of the bolt as the rotating threaded portion of the bolt passes through the throughway. The projections may be bristles or pins. Optionally, the bolt receiving portion may include a plurality of throughways each configured to receive a threaded portion having a different outer diameter. Optionally, the apparatus may include a handle portion that may be selectively couplable to the bolt receiving portion.

13 Claims, 14 Drawing Sheets

BOLT CLEANING APPARATUS

BACKGROUND OF THE INVENTION

Field of the Invention

The present invention is directed generally to devices for cleaning bolts, and more particularly to devices for cleaning threaded portions of bolts.

Description of the Related Art

Many automobile mechanics work on a wide variety of vehicles, which include differently sized bolts. To avoid expenses related to purchasing new bolts, bolts removed from a vehicle may be reused. However, used bolts may be rusted and/or covered with debris, which can make reusing them difficult. Therefore, a mechanic will often clean the bolt before the bolt is reused. It can be particularly important to remove the rust and other debris from the threads of the bolt so that the bolt can be readily received inside a threaded opening.

Unfortunately, cleaning bolts can be both time consuming and dangerous. Typically, a bench grinder is used to rotate a wire wheel at high speeds. The mechanic presses the bolt against the rotating wire wheel, which may cause physical injury to the mechanic and can be a workplace danger. For example, if the mechanic loses his/her grip on the bolt, the rotating wheel can throw the bolt, which may hit the mechanic and/or others in the workplace.

The Occupational Safety and Health Administration ("OSHA") and the Mine Safety and Health Administration ("MSHA") have issued regulations related to the use of both bench grinders and wire wheels in the workplace. These regulations make cleaning bolts using bench grinders and wire wheels costly because companies need to make sure their equipment complies with these regulations, and their employees are properly trained.

Therefore, a need exists for methods and apparatuses configured to clean bolts safely. Methods and apparatuses that avoid using a bench grinder to rotate a wire wheel would be particularly desirable. The present application provides these and other advantages as will be apparent from the following detailed description and accompanying figures.

BRIEF DESCRIPTION OF THE SEVERAL VIEWS OF THE DRAWING(S)

Like reference numerals have been used to identify like structures in the figures.

DETAILED DESCRIPTION OF THE INVENTION

Figure 1:
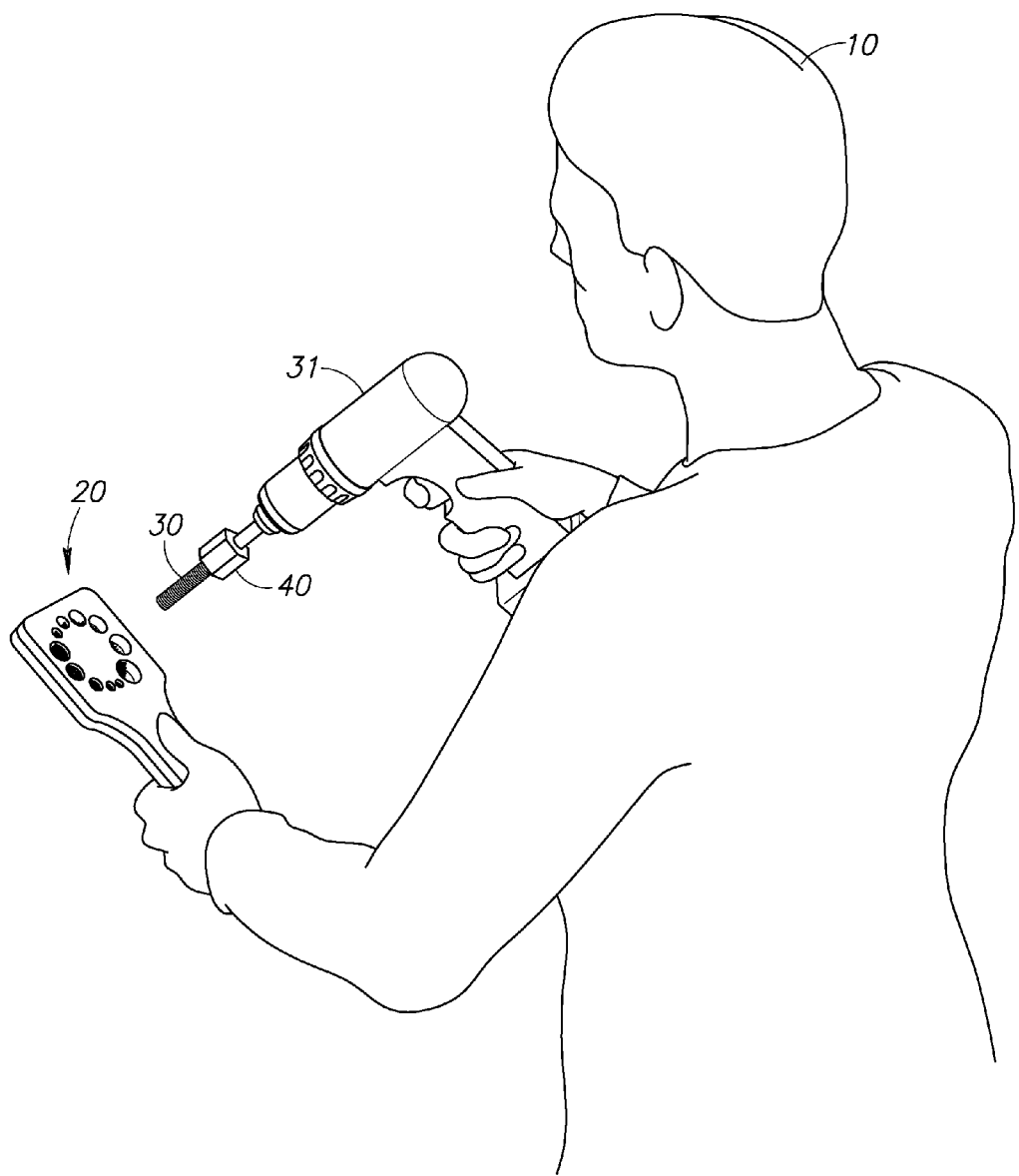
FIG. 1 is a perspective view of a user holding a first embodiment of a bolt cleaning apparatus.
Figure 2:
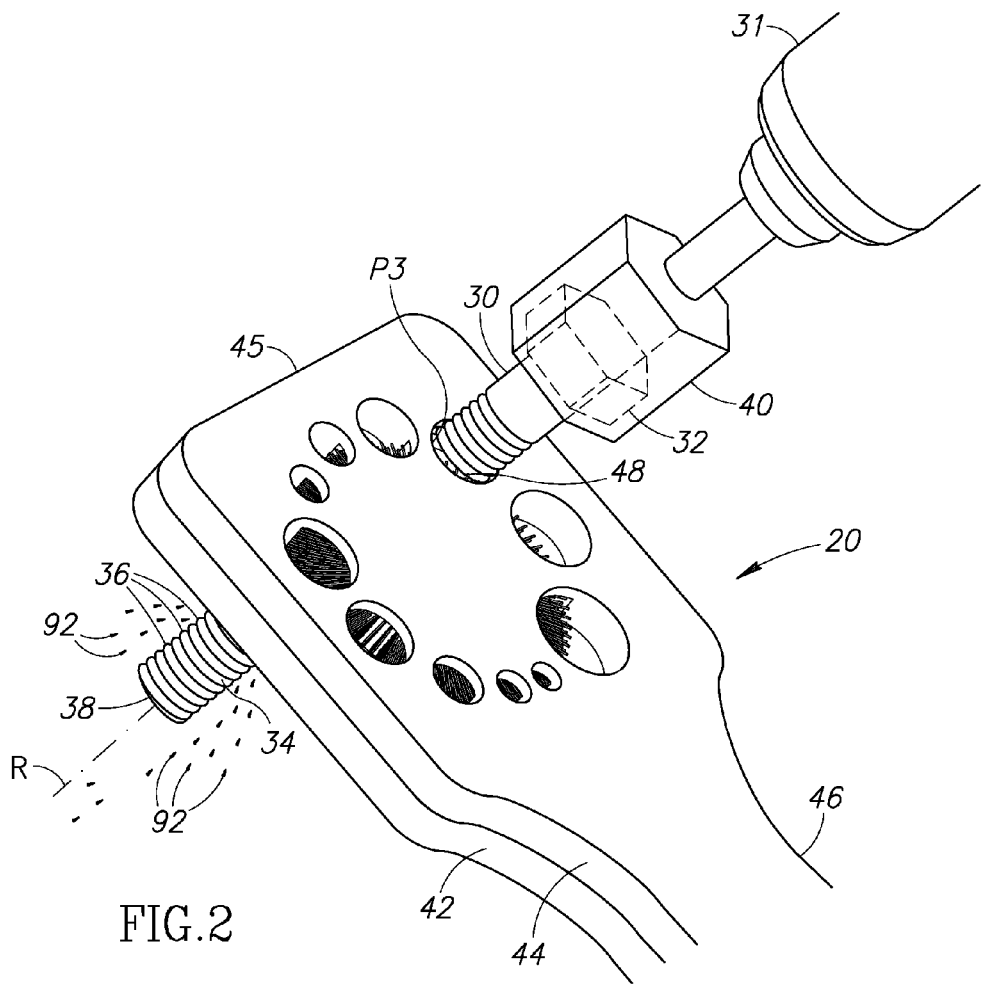
FIG. 2 is a perspective view of the first embodiment of the bolt cleaning apparatus.

FIGS. 1, 2, 4, and 5 depict a first embodiment of a bolt cleaning apparatus 20 that may be used to clean a bolt 30 (see FIGS. 1 and 2). FIG. 1 is a perspective view of a user 10 holding the apparatus 20. The bolt 30 is depicted coupled to a rotary power tool 31 (such as an air impact wrench or drill) that may be used to rotate the bolt 30. Alternatively, the bolt 30 may be rotated by a manual tool (such as a ratchet), or manually by the hands of the user 10. By way of yet another non-limiting example, the apparatus 20 may be rotated about the bolt 30.

Figure 3:
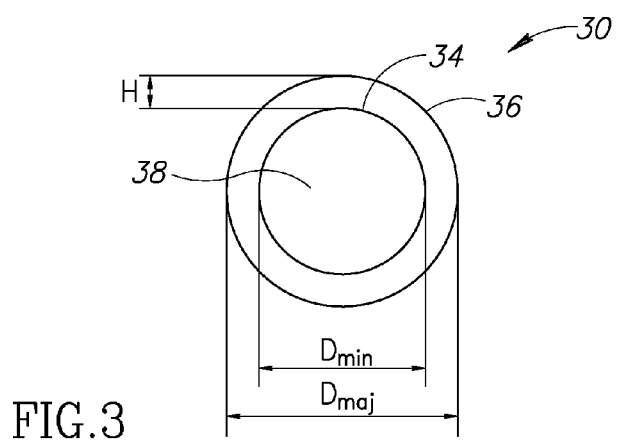
FIG. 3 is a view of a free end portion of a bolt opposite a bolt head.

Referring to FIG. 2, as is apparent to those of ordinary skill in the art, the bolt 30 has a bolt head 32, and a threaded portion 34 with external threads 36. The bolt 30 is configured to be rotated about a longitudinal axis of rotation "R" (e.g., by the rotary power tool 31). The threaded portion 34 has a free end portion 38. FIG. 3 is a view of the free end portion 38 of the bolt 30. As illustrated in FIG. 3, the threaded portion 34 has a major diameter "$D_{MAJ}$" and a minor diameter "$D_{MIN}$." Further, the external threads 36 have a thread height "H." In the embodiment illustrated, a socket 40 has been coupled to the rotary power tool 31 and used to hold the bolt head 32.

Figure 4:
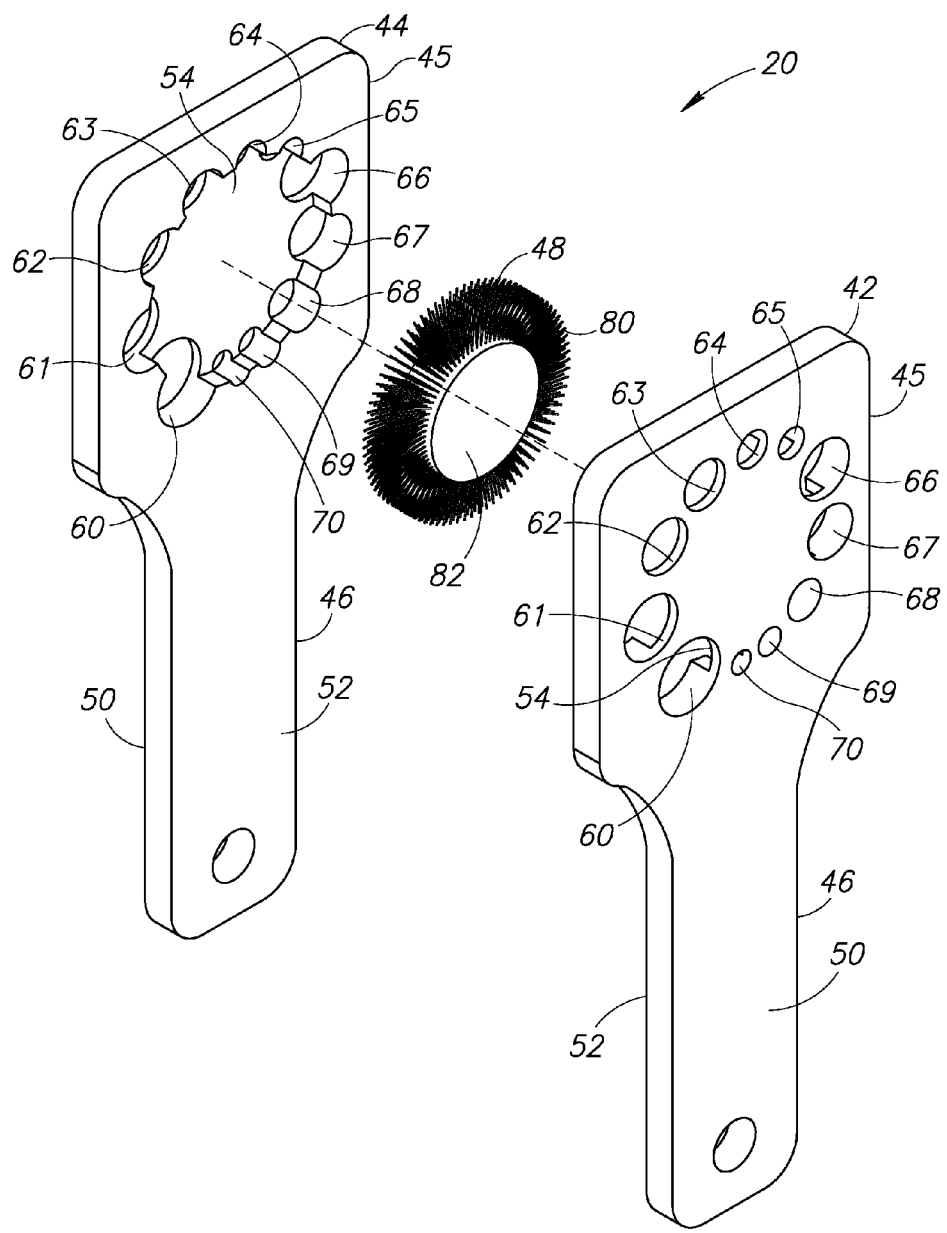
FIG. 4 is an exploded perspective view of the first embodiment of the bolt cleaning apparatus.
Figure 5:
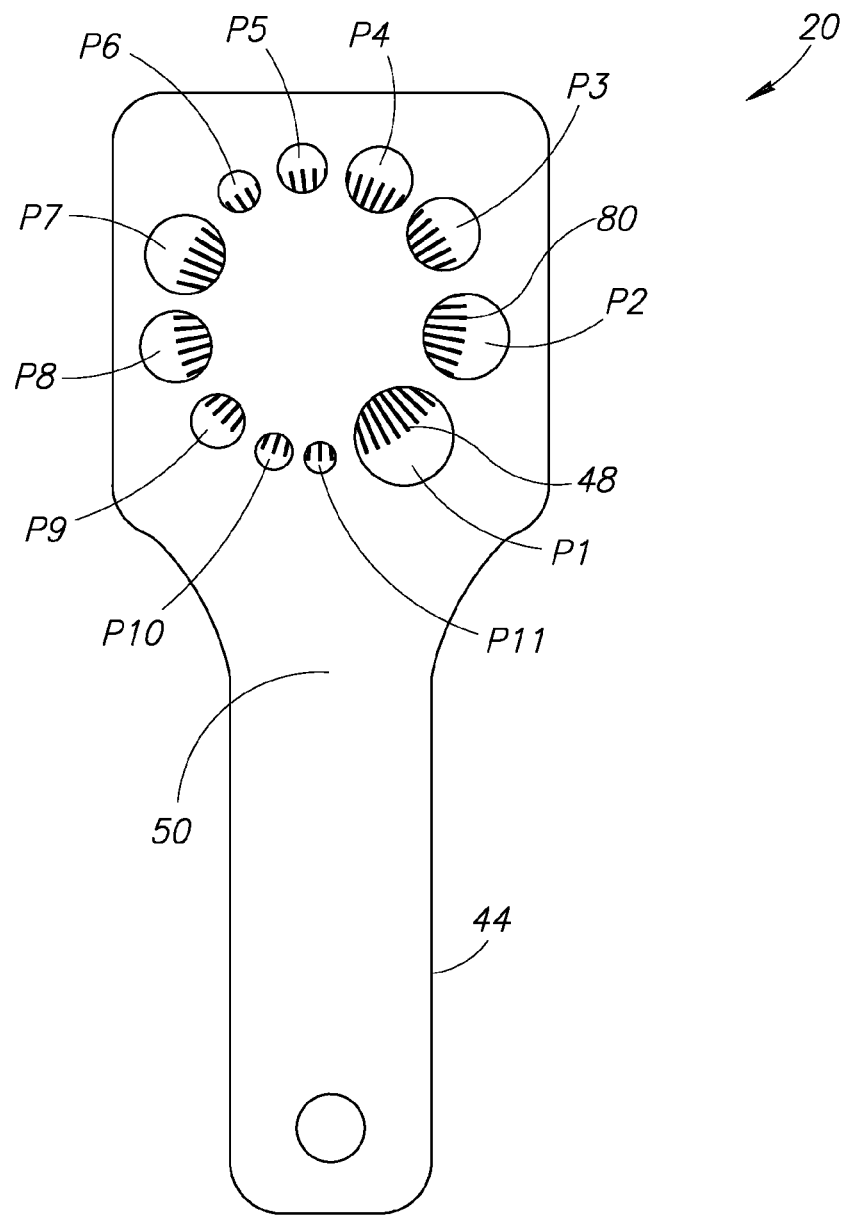
FIG. 5 is a plan view of the first embodiment of the bolt cleaning apparatus.

FIG. 4 is an exploded perspective view of the apparatus 20. The apparatus 20 includes a first body portion 42, a second body portion 44, and a cleaning member 48. In the embodiment illustrated, the first and second body portions 42 and 44 are mirror images of one another. Each of the first and second body portions 42 and 44 has an outwardly facing surface 50 opposite an inwardly facing surface 52. Further, each of the first and second body portions 42 and 44 has a bolt receiving portion 45, and may have an optional a handle portion 46.

A recess 54 formed in the inwardly facing surfaces 52 of each of the first and second body portions 42 and 44. The recess 54 is formed in the bolt receiving portion 45 of each of the first and second body portions 42 and 44. When assembled, the inwardly facing surfaces 52 of the first and second body portions 42 and 44 are adjacent and abut one another face-to-face and the recesses 54 of the first and second body portions 42 and 44 are aligned with one another. The cleaning member 48 is sandwiched between the first and second body portions 42 and 44 and positioned inside the aligned recesses 54. The cleaning member 48 is trapped inside the aligned recesses 54, and prevented from being removed therefrom.

When the apparatus 20 is assembled, the first and second body portions 42 and 44 are permanently or removably fastened together. For example, the inwardly facing surfaces 52 of the first and second body portions 42 and 44 may be glued together. Optionally, one or more fasteners (e.g., bolts, screws, and the like) may be used to fasten the inwardly facing surfaces 52 of the first and second body portions 42 and 44 together. By way of yet another example, the first and second body portions 42 and 44 may be snapped together using a conventional snap fit connection. The apparatus 20 is not limited to a particular method of coupling the first and second body portions 42 and 44 together.

The bolt receiving portion 45 of each of the first and second body portions 42 and 44 includes a plurality of throughways 60-70 that extend from the outwardly facing surface 50 through the inwardly facing surface 52. When the apparatus 20 is assembled, the throughways 60-70 in the first body portion 42 are aligned with the throughways 60-70 in the second body portion 44. Thus, as may be viewed in FIG. 5, through passages "P1" to "P11" are formed and extend between the outwardly facing surfaces 50 of the first and second body portions 42 and 44. Returning to FIG. 4, in each of the first and second body portions 42 and 44, each of the throughways 60-70 extends at least partly into the recess 54. Thus, as may be viewed in FIG. 5, a portion of the cleaning member 48 extends laterally into each of the through passages "P1" to "P11" when the apparatus 20 is assembled.

Referring to FIG. 4, in the embodiment illustrated, the cleaning member 48 is generally disc shaped with radially outwardly extending wire bristles 80. In the embodiment illustrated, the wire bristles 80 extend radially outwardly from a cylindrically shaped central portion 82. The cleaning member 48 may be implemented as a wire wheel, a cylindrically shaped card clothing member, and the like. By way of a non-limiting example, the cleaning member 48 may be an assembly of two or more wire wheels coupled together at their centers by a fastener (e.g., a bolt and a nut). Optionally, one or more washers (not shown) may be positioned between adjacent ones of the wire wheels in the assembly. By way of a non-limiting example, the cleaning member 48 may have a diameter of about 1.5 inches. As may be viewed in FIG. 5, when the apparatus 20 is assembled, end portions of at least some of the wire bristles 80 extend laterally into each of the through passages "P1" to "P11."

In the embodiment illustrated, each of the through passages "P1" to "P11" is generally cylindrically shaped and has a different diameter. Thus, the through passages "P1" to "P11" may each accommodate a bolt having a different major diameter. In alternate embodiments, two or more of the through passages "P1" to "P11" may have the same diameter. By way of non-limiting examples, the through passages "P1" to "P11" may have diameters indicated in Table A below:

TABLE A

| Through Passage | Diameter |
| --- | --- |
| P1 | 0.5625 inches |
| P2 | 0.5 inches |
| P3 | 0.4375 inches |
| P4 | 0.375 inches |
| P5 | 0.3125 inches |
| P6 | 0.25 inches |
| P7 | 12 millimeters |
| P8 | 10 millimeters |
| P9 | 8 millimeters |
| P10 | 6 millimeters |
| P11 | 5 millimeters |

As mentioned above and illustrated in FIG. 3, the threaded portion 34 of the bolt 30 has the major diameter "$D_{MAJ}$" and the external threads 36 have the thread height "H." The threaded portion 34 of the bolt 30 may be inserted into one of the through passages "P1" to "P11" having a diameter that is greater than the major diameter "$D_{MAJ}$." For ease of illustration, the threaded portion 34 will be described as being inserted into the through passage "P3" as illustrated in FIG. 2. To clean the threads 36, the end portions of at least some of the wire bristles 80 may extend laterally into the through passage "P3" a distance equal to or greater than the thread height "H." By way of a non-limiting example, the end portions of at least some of the wire bristles 80 may extend laterally into the through passage "P3" a distance that is at least two to three times the thread height "H."

Referring to FIG. 2, the rotary power tool 31, a manual tool (not shown), or the hand of the user 10, may be used to rotate the bolt 30 inside the through passage "P3." By way of yet another non-limiting example, the apparatus 20 may be rotated about the bolt 30. In example illustrated in FIG. 2, the socket 40 is coupled to the rotary power tool 31 and the bolt head 32. Then, the rotary power tool 31 is used to rotate the bolt 30 while the user 10 passes the threaded portion 36 of the bolt 30 through the through passage "P3." As the threaded portion 36 encounters the cleaning member 48 (e.g., the end portions of at least some of the wire bristles 80), the cleaning member 48 removes debris 92 from the external threads 36 thereby cleaning the bolt 30. The user 10 may pass all or a portion of the threaded portion 36 of the bolt 30 through the through passage "P3." Further, all or a portion of the threaded portion 36 of the bolt 30 may be passed through the through passage "P3" more than once.

Returning to FIG. 4, as mentioned above, each of the first and second body portions 42 and 44 may include the handle portion 46. When the apparatus 20 is used to clean the threads 36 of the bolt 30, the user 10 (see FIG. 1) may grip the apparatus 20 by the handle portions 46 of the first and second body portions 42 and 44. Optionally, the handle portions 46 of the first and second body portions 42 and 44 may be held by a tool (such as a vise, clamp, and the like) when the apparatus 20 is used.

Each of the first and second body portions 42 and 44 may be constructed from any suitable material, such as plastic (e.g., Ptex, nylon), metal, and the like. By way of non-limiting examples, each of the first and second body portions 42 and 44 may be may be about 9.5 inches long (including the optional handle portions 46). The bolt receiving portion 45 may be about 2.5 inches wide and about 2.75 inches long. The optional handle portions may be about one inch wide and about 6.75 inches long.

Second Embodiment

Figure 6:
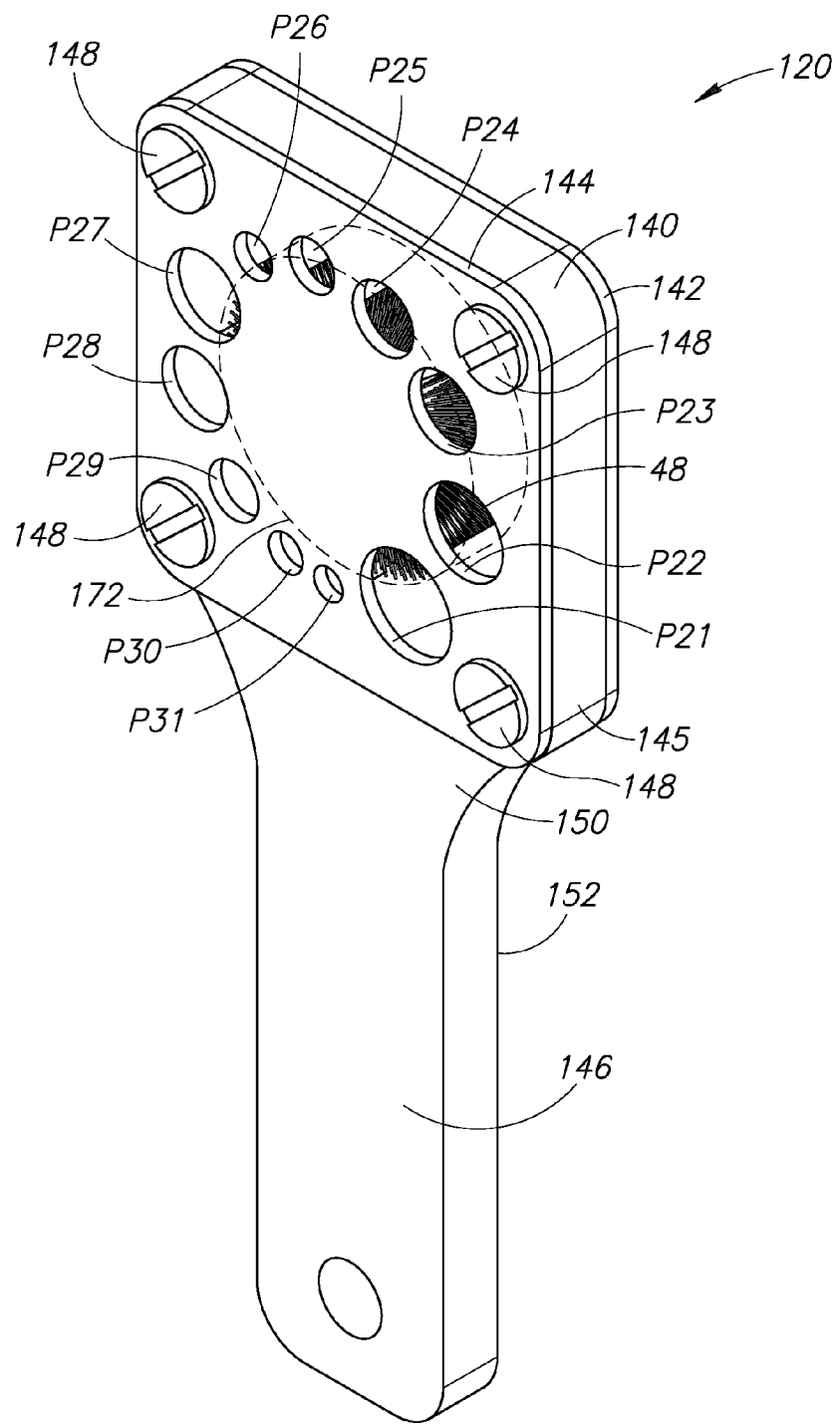
FIG. 6 is a perspective view of a second embodiment of a bolt cleaning apparatus.
Figure 7:
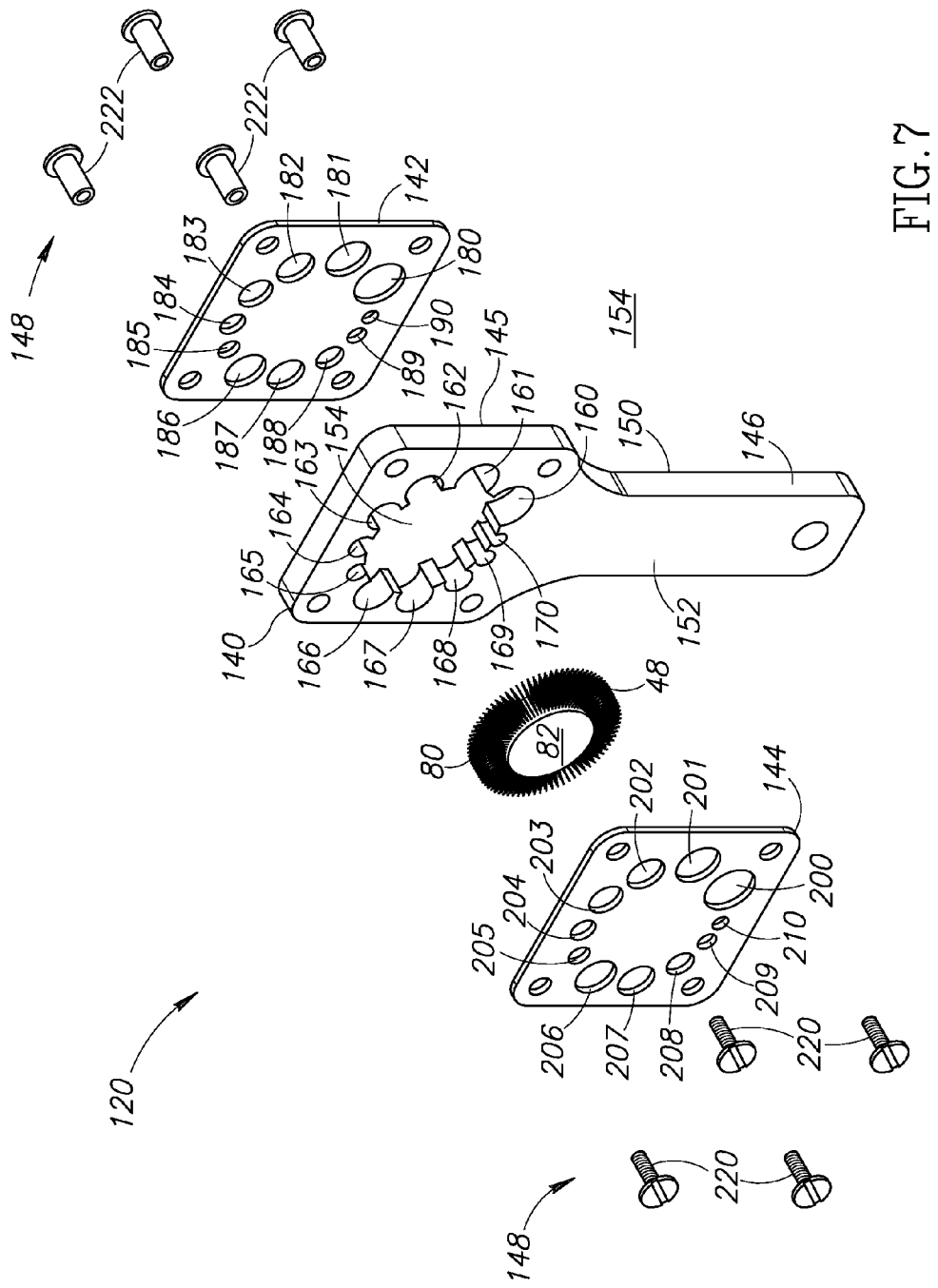
FIG. 7 is an exploded perspective view of the second embodiment of the bolt cleaning apparatus.

FIGS. 6 and 7 depict a second embodiment of a bolt cleaning apparatus 120 that may be used to clean the bolt 30 (see FIGS. 1-3). Referring to FIG. 7, the apparatus 120 includes a body portion 140, a first cover plate 142, a second cover plate 144, the cleaning member 48, and optional fasteners 148.

The body portion 140 has a first side portion 150 opposite a second side portion 152. The body portion 140 has a bolt receiving portion 145, and may optionally have a handle portion 146. The bolt receiving portion 145 has an aperture 154 and a plurality of spaced apart through holes 160-170 that each extend from the first side portion 150 through to the second side portion 152. The aperture 154 is circular and has a perimeter 172 (see FIG. 6). The through holes 160-170 are positioned about and overlap with the perimeter 172 of the aperture 154. Thus, the aperture 154 forms a contiguous opening with each of the through holes 160-170. The body portion 140 may be constructed from any suitable material, such as plastic (e.g., Ptex, nylon), metal, and the like. By way of non-limiting examples, the body portion 140 may be about 0.5 inches thick and about 9.5 inches long (including the optional handle portion 146). The bolt receiving portion 145 may be about 2.5 inches wide and about 2.75 inches long. The optional handle portion 146 may be about one inch wide and about 6.75 inches long.

The first cover plate 142 has a plurality of spaced apart through holes 180-190 configured to be aligned with the through holes 160-170, respectively, of the body portion 140. Similarly, the second cover plate 144 has a plurality of spaced apart through holes 200-210 configured to be aligned with the through holes 160-170, respectively, of the body portion 140. The body portion 140 is sandwiched in between the first and second cover plates 142 and 144 with the through holes 180-190 of the first cover plate 142 aligned with the through holes 160-170, respectively, of the body portion 140, and the through holes 200-210 of the second cover plate 144 aligned with the through holes 160-170, respectively, of the body portion 140. Thus, referring to FIG. 6, open-ended through passages "P21" to "P31" are defined by the alignment of the through holes 180-190, with the through holes 160-170, respectively, and the through holes 200-210, respectively. Each of the first and second cover plates 142 and 144 may be constructed from any suitable material, such as plastic (e.g., Plexiglas), metal, and the like. In the embodiment illustrated, the first and second cover plates 142 and 144 are each constructed from an opaque material. However, this is not a requirement. By way of a non-limiting example, the first and second cover plates 142 and 144 may each be about 0.125 inches thick.

In the embodiment illustrated, each of the through passages "P21" to "P31" is generally cylindrically shaped and has a different diameter. Thus, the through passages "P21" to "P31" may each accommodate a bolt having a different major diameter. In alternate embodiments, two or more of the through passages "P21" to "P31" may have the same diameter. By way of non-limiting examples, the through passages "P21" to "P31" may have the same diameters as the through passages "P1" to "P11," respectively (see FIG. 5).

Returning to FIG. 7, the cleaning member 48 is positioned inside the aperture 154 between the first and second cover plates 142 and 144. Thus, the first and second cover plates 142 and 144 trap the cleaning member 48 inside the aperture 154, and prevent the cleaning member 48 from being removed from the aperture 154. The through holes 160-170 are spaced apart about the perimeter 172 (see FIG. 6) of the aperture 154 such that portions of the body portion 140 prevent the cleaning member 48 from moving laterally within the aperture 154 between the first and second cover plates 142 and 144. Thus, the cleaning member 48 is substantially stationary inside the aperture 154.

A different portion of the cleaning member 48 extends part way into each of the through passages "P21" to "P31" (see FIG. 6). For example, in embodiments in which the cleaning member 48 is implemented as a wire wheel, end portions of at least some of the wire bristles 80 may extend laterally into each of the through passages "P21" to "P31."

The optional fasteners 148 may fasten the first cover plate 142 to the first side portion 150 of the body portion 140, and the second cover plate 144 to the second side portion 152 of the body portion 140 with the cleaning member 48 positioned inside the aperture 154. The fasteners 148 may be implemented as bolts, screws, and the like. In the embodiment illustrated, the fasteners 148 include bolts 220 and bolt receivers 222. In alternate embodiments, the first and second cover plates 142 and 144 may be attached to the body portion 140 in another manner, such as by welding, an adhesive, and the like.

The apparatus 120 is used in a manner substantially identical to how the apparatus 20 is used. For example, the rotary power tool 31, a manual tool (not shown), or the hand of the user 10, may be used to rotate the bolt 30 inside a selected one of the through passages "P21" to "P31" (see FIG. 6). By way of yet another non-limiting example, the apparatus 120 may be rotated about the bolt 30 as the bolt is maintained inside one of the selected one of through passages "P21" to "P31." To clean the threads 36 (see FIG. 2), the end portions of at least some of the wire bristles 80 may extend laterally into the selected one of through passages "P21" to "P31" a distance equal to or greater than the thread height "H" (see FIG. 3). By way of a non-limiting example, the end portions of at least some of the wire bristles 80 may extend laterally into the selected one of through passages "P21" to "P31" a distance that is at least two to three times the thread height "H."

As mentioned above, the body portion 146 may include the handle portion 146. When the apparatus 120 is used to clean the threads 36 of the bolt 30, the user 10 (see FIG. 1) may grip the apparatus 120 by the handle portion 146. Optionally, the handle portion 146 may be held by a tool (such as a vise, clamp, and the like) when the apparatus 120 is used. As the user 10 (and/or a tool) grips the handle portion 146, the threaded portion 34 (see FIG. 2) of the bolt 30 may be inserted into the selected one of through passages "P21" to "P31," and rotated therein against the cleaning member 48, which cleans the portion of the bolt 30 rotated against the cleaning member 48. Alternatively, the apparatus 120 may be rotated about the bolt 30 when the threaded portion 34 of the bolt is received inside the selected one of through passages "P21" to "P31" to thereby rotate a portion of the cleaning member 48 against the bolt 30, which cleans the portion of the bolt 30 against which the cleaning member 48 is rotated.

As the threaded portion 36 encounters the cleaning member 48 (e.g., the end portions of at least some of the wire bristles 80), the cleaning member 48 removes debris from the external threads 36 thereby cleaning the bolt 30. All or a portion of the threaded portion 34 of the bolt 30 may be inserted into, rotated therein, and removed from the through passage "P23" a selected number of times to clean the bolt 30. For example, the threaded portion 34 of the bolt 30 may be inserted into the selected one of through passages "P21" to "P31," rotated therein, and passed along the cleaning member 48. When the entire length of the rotating threaded portion 34 of the bolt 30 has passed along a portion of the cleaning member 48, the rotating threaded portion 34 may be withdrawn from the through passage "P23," which passes the threaded portion 34 along the cleaning member 48 a second time. If desired, a portion of the threaded portion 34 of the bolt 30 may be maintained in a stationary position inside the through passage "P23" as the bolt is rotated alongside the cleaning member 48 to clean that portion of the bolt 30 more thoroughly.

Third Embodiment

Figure 8:
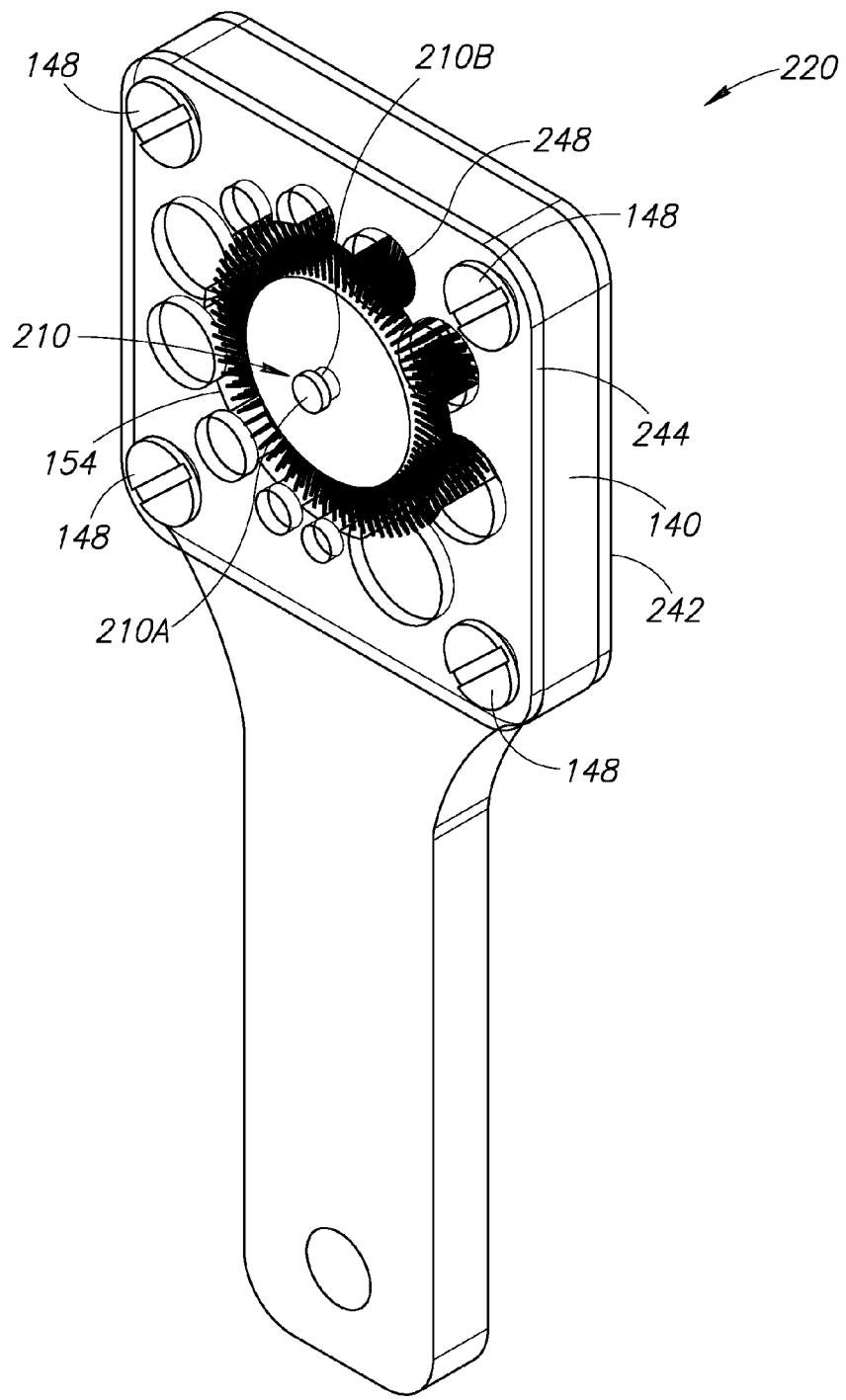
FIG. 8 is a perspective view of a third embodiment of a bolt cleaning apparatus.
Figure 9:
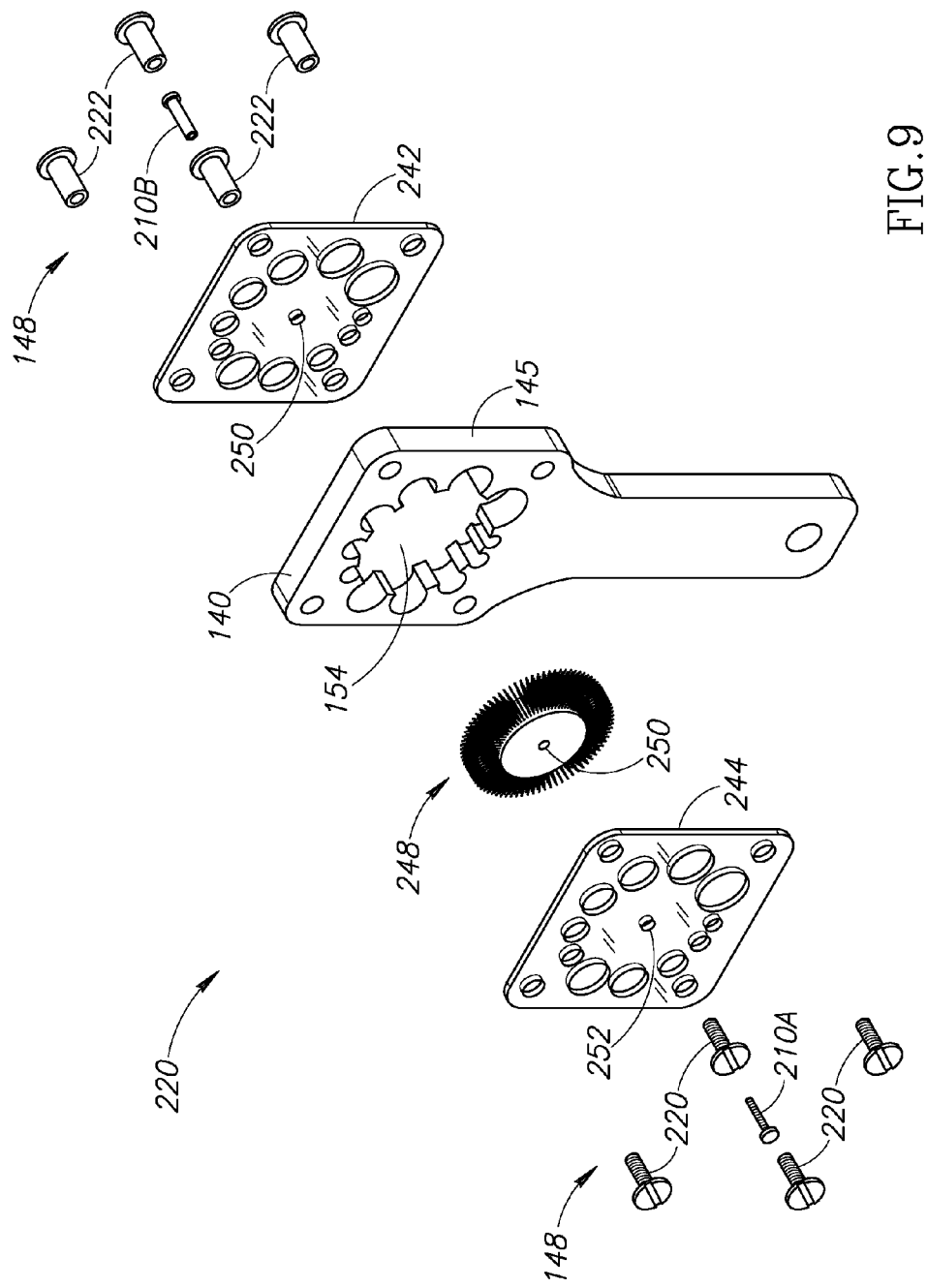
FIG. 9 is an exploded perspective view of the third embodiment of the bolt cleaning apparatus.

FIGS. 8 and 9 depict a third embodiment of a bolt cleaning apparatus 220 that may be used to clean the bolt 30 (see FIGS. 1-3). The bolt cleaning apparatus 220 is substantially similar to the bolt cleaning apparatus 120 (see FIGS. 6 and 7). Therefore, only components of the bolt cleaning apparatus 220 that differ from those of the bolt cleaning apparatus 120 will be described in detail.

Referring to FIG. 8, the apparatus 220 includes the body portion 140, a first cover plate 242, a second cover plate 244, a fastener 210, a cleaning member 248, and the optional fasteners 148. The fastener 210 illustrated includes a bolt 210A and a bolt receiver 210B.

Turning to FIG. 9, the cleaning member 248 is substantially similar to the cleaning member 48 (see FIGS. 2 and 4-7). However, the cleaning member 248 includes a through-hole 250 configured to receive the fastener 210 (see FIG. 8), which in the embodiment illustrated has been implemented as the bolt 210A and the bolt receiver 210B. The cleaning member 248 may be implemented using any component (e.g., a wire wheel, a cylindrically shaped card clothing member, and the like) suitable for implementing the cleaning member 48.

The first cover plate 242 is substantially similar to the first cover plate 142 (see FIGS. 6 and 7). However, the first cover plate 242 is constructed from a transparent material. Further, the first cover plate 242 includes a through-hole 250 configured to receive the fastener 210 (e.g., the bolt 210A and the bolt receiver 210B).

The second cover plate 244 is substantially similar to the second cover plate 144 (see FIGS. 6 and 7). However, the second cover plate 244 is constructed from a transparent material. Further, the second cover plate 244 includes a through-hole 252 configured to receive the fastener 210 (e.g., the bolt 210A and the bolt receiver 210B).

The fastener 210 (e.g., the bolt 210A and the bolt receiver 210B) extends through the through-holes 252 and 250 and the aperture 254 and helps maintain the cleaning member 248 inside the aperture 154 of the body portion 140.

Fourth Embodiment

Figure 10:
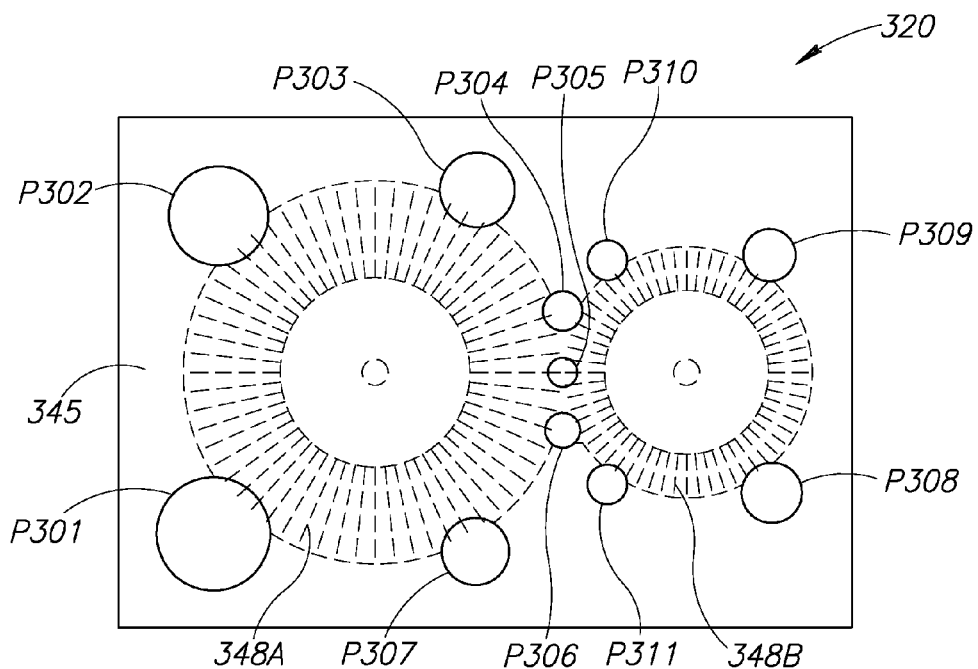
FIG. 10 is a plan view of the fourth embodiment of the bolt cleaning apparatus.

FIG. 10 depicts a fourth embodiment of a bolt cleaning apparatus 320 that includes a bolt receiving portion 345, and a pair of spaced apart cleaning members 348A and 348B. The cleaning members 348A and 348B may be coupled to the bolt receiving portion 345 in any manner described above as suitable for coupling the cleaning member 48 to the bolt receiving portions 45 of the apparatus 20 (see FIGS. 1, 2, 4, and 5), in any manner described above as suitable for coupling the cleaning member 48 to the bolt receiving portion 145 the apparatus 120 (see FIGS. 6 and 7), in any manner described above as suitable for coupling the cleaning member 248 to the bolt receiving portion 145 the apparatus 220 (see FIGS. 7 and 8), and the like.

The cleaning members 348A and 348B are each substantially similar to the cleaning member 248 (see FIGS. 8 and 9). In FIG. 10, the cleaning members 348A and 348B have been implemented as a pair of wire wheels having different diameters. However, this is not a requirement.

The bolt receiving portion 345 includes a plurality of through passages "P301" to "P311" positioned such that a portion of at least one of the cleaning members 348A and 348B extends laterally into each of the through passages. In the embodiment illustrated, the through passages "P301" to "P307" are positioned circumferentially about the cleaning members 348A, and the through passages "P304" to "P306" and "P308" to "P311" are positioned circumferentially about the cleaning members 348B. Thus, a portion of each of the cleaning members 348A and 348B may extend into the through passages "P304" to "P306" to clean any bolts inserted therein. Optionally, the bolt cleaning apparatus 320 may include a handle portion like the handle portion 146 (see FIGS. 6 and 7). However, this is not a requirement.

The threaded portion 34 of the bolt 30 (see FIGS. 1-3) may be received inside one of the through passages "P301" to "P311" and cleaned therein as described above with respect to the bolt cleaning apparatus 20.

Fifth Embodiment

Figure 11:
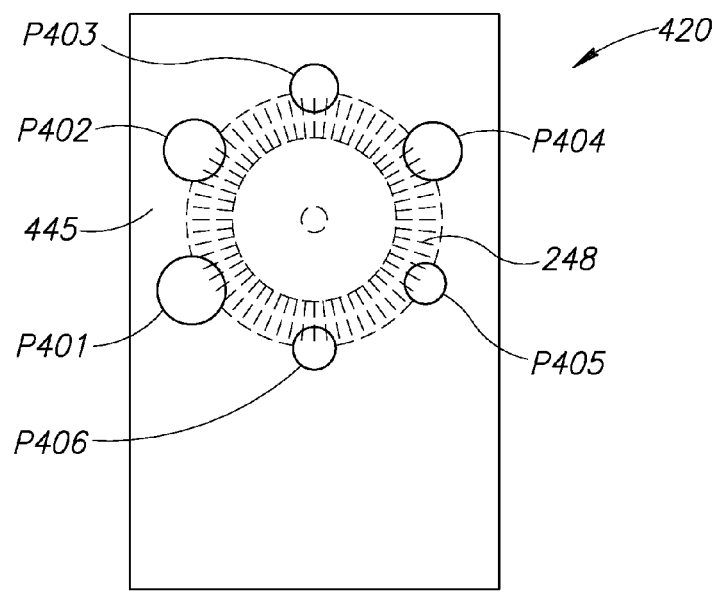
FIG. 11 is a plan view of the fifth embodiment of the bolt cleaning apparatus.

FIG. 11 depicts a fifth embodiment of a bolt cleaning apparatus 420 that includes a bolt receiving portion 445 and the cleaning member 248. The cleaning member 248 may be coupled to the bolt receiving portion 445 in any manner described above as suitable for coupling the cleaning member 48 to the bolt receiving portions 45 of the apparatus 20 (see FIGS. 1, 2, 4, and 5), in any manner described above as suitable for coupling the cleaning member 48 to the bolt receiving portion 145 the apparatus 120 (see FIGS. 6 and 7), in any manner described above as suitable for coupling the cleaning member 248 to the bolt receiving portion 145 the apparatus 220 (see FIGS. 7 and 8), and the like The bolt receiving portion 445 includes a plurality of through passages "P401" to "P406" positioned such that at least a portion of the cleaning member 248 extends laterally into each of the through passages. In the embodiment illustrated, the through passages "P401" to "P406" are positioned circumferentially about the cleaning member 248. Optionally, the bolt cleaning apparatus 420 may include a handle portion like the handle portion 146 (see FIGS. 6 and 7). However, this is not a requirement.

The threaded portion 34 of the bolt 30 (see FIGS. 1-3) may be received inside one of the through passages "P401" to "P406" and cleaned therein as described above with respect to the bolt cleaning apparatus 20.

Sixth Embodiment

Figure 12:
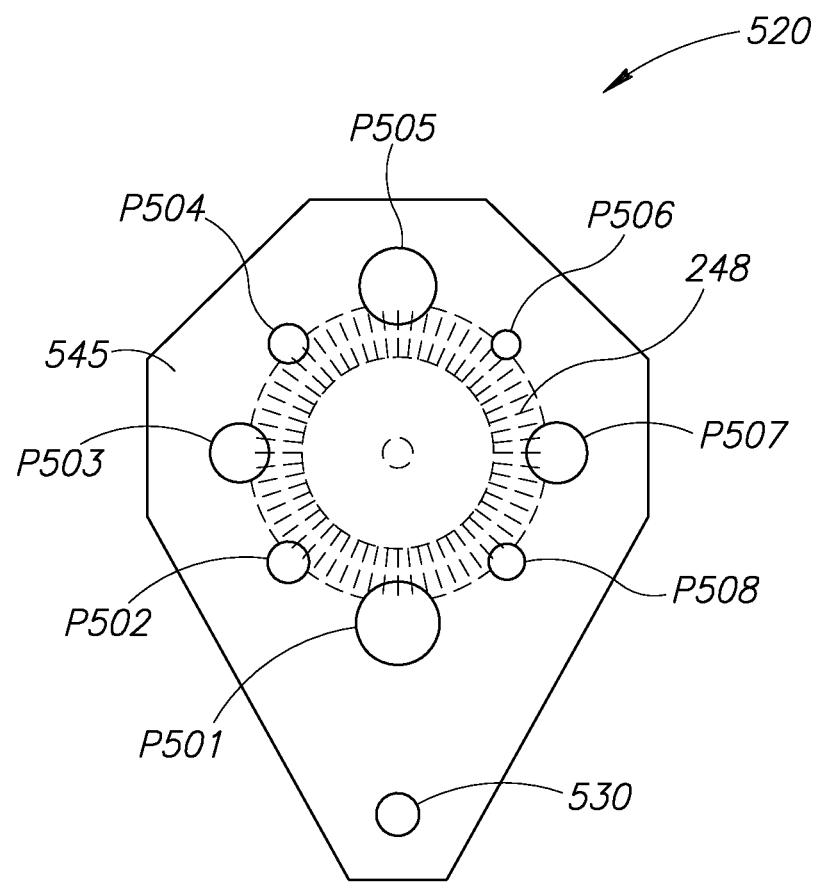
FIG. 12 is a plan view of the sixth embodiment of the bolt cleaning apparatus.

FIG. 12 depicts a sixth embodiment of a bolt cleaning apparatus 520 that includes a bolt receiving portion 545 and the cleaning member 248. The cleaning member 248 may be coupled to the bolt receiving portion 545 in any manner described above as suitable for coupling the cleaning member 48 to the bolt receiving portions 45 of the apparatus 20 (see FIGS. 1, 2, 4, and 5), in any manner described above as suitable for coupling the cleaning member 48 to the bolt receiving portion 145 the apparatus 120 (see FIGS. 6 and 7), in any manner described above as suitable for coupling the cleaning member 248 to the bolt receiving portion 145 the apparatus 220 (see FIGS. 7 and 8), and the like The bolt receiving portion 545 includes a plurality of through passages "P501" to "P508" positioned such that at least a portion of the cleaning member 248 extends laterally into each of the through passages. In the embodiment illustrated, the through passages "P501" to "P508" are positioned circumferentially about the cleaning member 248. Optionally, the bolt cleaning apparatus 520 may include a handle portion like the handle portion 146 (see FIGS. 6 and 7). However, this is not a requirement.

The threaded portion 34 of the bolt 30 (see FIGS. 1-3) may be received inside one of the through passages "P501" to "P508" and cleaned therein as described above with respect to the bolt cleaning apparatus 20.

The apparatus 520 includes an aperture 530 that may be used to hang the apparatus 520 from a pin, peg, nail, string, cord, and the like for storage.

Seventh Embodiment

Figure 13:
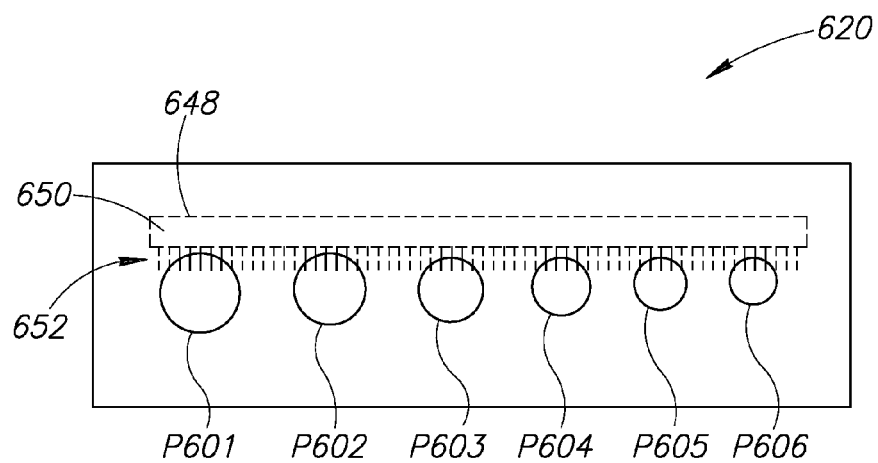
FIG. 13 is a plan view of the seventh embodiment of the bolt cleaning apparatus.

FIG. 13 depicts a seventh embodiment of a bolt cleaning apparatus 620. The apparatus 620 includes a generally linear (or strip shaped) cleaning member 648. In the embodiment illustrated, the cleaning member 648 includes a body portion 650 and projections 652 (e.g., bristles, pins, and the like) that extend away from the body portion 650. Like previously described embodiments, the apparatus 620 includes a plurality of through passages "P601" to "P606" positioned such that at least a portion of the projections 652 extend laterally into each of the through passages. In the embodiment illustrated, the through passages "P601" to "P606" are depicted as being in a generally linear arrangement. However, this is not a requirement.

The threaded portion 34 of the bolt 30 (see FIGS. 1-3) may be received inside one of the through passages "P601" to "P606" and cleaned therein as described above with respect to the bolt cleaning apparatus 20.

Eighth Embodiment

Figure 14:
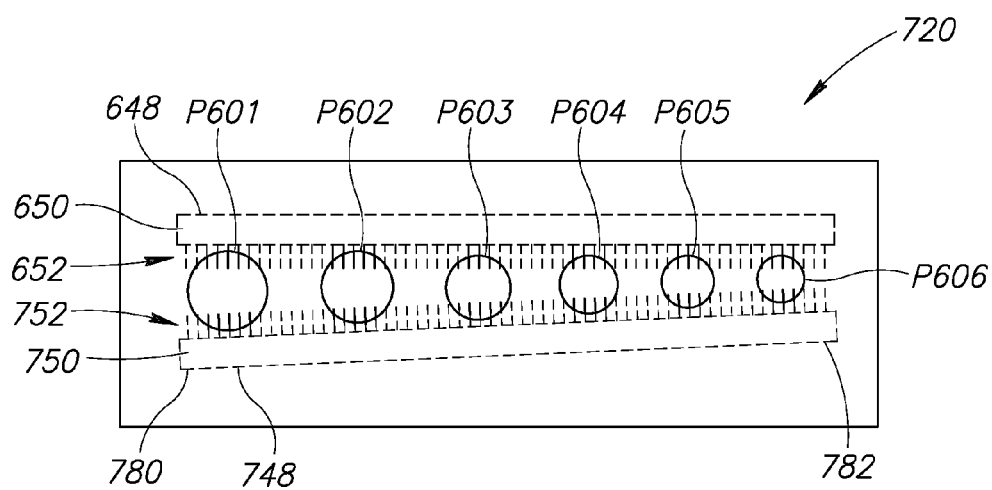
FIG. 14 is a plan view of the eighth embodiment of the bolt cleaning apparatus.

FIG. 14 depicts an eighth embodiment of a bolt cleaning apparatus 720. The apparatus 720 is substantially similar to the apparatus 620 illustrated in FIG. 13. Therefore, only difference between the apparatus 720 and the apparatus 620 will be described in detail.

Referring to FIG. 14, the apparatus 720 includes a second generally linear (or strip shaped) cleaning member 748 spaced part from the first cleaning member 648. The cleaning member 748 is substantially identical to the cleaning member 648. Thus, the cleaning member 748 includes a body portion 750 and projections 752 (e.g., bristles, pins, and the like) that extend away from the body portion 750.

The cleaning member 748 is positioned so that it is not parallel with the cleaning member 648. For example, the cleaning member 748 may be farther from the cleaning member 648 nearer its first end portion 780, and closer to the cleaning member 648 nearer its second end portion 782. The projections 752 of the cleaning member 748 extend toward the cleaning member 648, and the projections 652 of the cleaning member 648 extend toward the cleaning member 748. The through passages "P601" to "P606" are positioned between the cleaning members 648 and 748 such that at least a portion of the projections 652 and 752 extend laterally into each of the through passages.

The threaded portion 34 of the bolt 30 (see FIGS. 1-3) may be received inside one of the through passages "P601" to "P606" and cleaned therein as described above with respect to the bolt cleaning apparatus 20. In the embodiment illustrated, each of the through passages "P601" to "P606" has a portion of the projections 652 and a portion of the projections 752 extending therein. Thus, in the embodiment illustrated, both the cleaning members 648 and 748 clean the threaded portion 34 of the bolt 30 (see FIGS. 1-3).

Ninth Embodiment

Figures 15, 16:
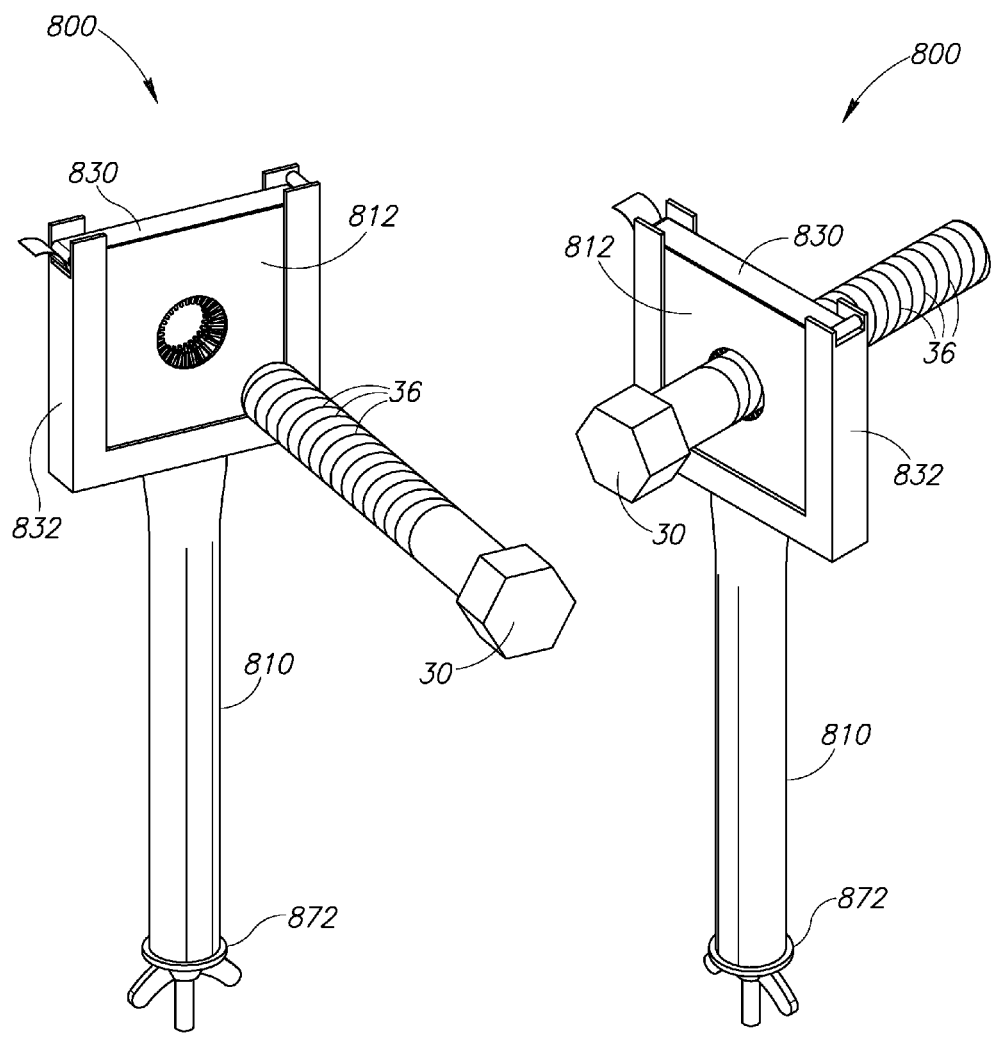
FIG. 15 is a first perspective view of a ninth embodiment of a bolt cleaning apparatus.
FIG. 16 is a second perspective view of the ninth embodiment of the bolt cleaning apparatus.

FIGS. 15-18 depict a ninth embodiment of a bolt cleaning apparatus 800 that may be used to clean the bolt 30. Referring to FIGS. 15 and 16, the apparatus 800 has a base portion 810 and one or more removable inserts (e.g., removable insert 812). For ease of illustration, the insert 812 has been illustrated. However, as is appreciated by those of ordinary skill in the art, different inserts may be used with the base portion 810. For example, the apparatuses 320, 420, 620, and/or 720 may be configured for use as inserts.

Figure 17:
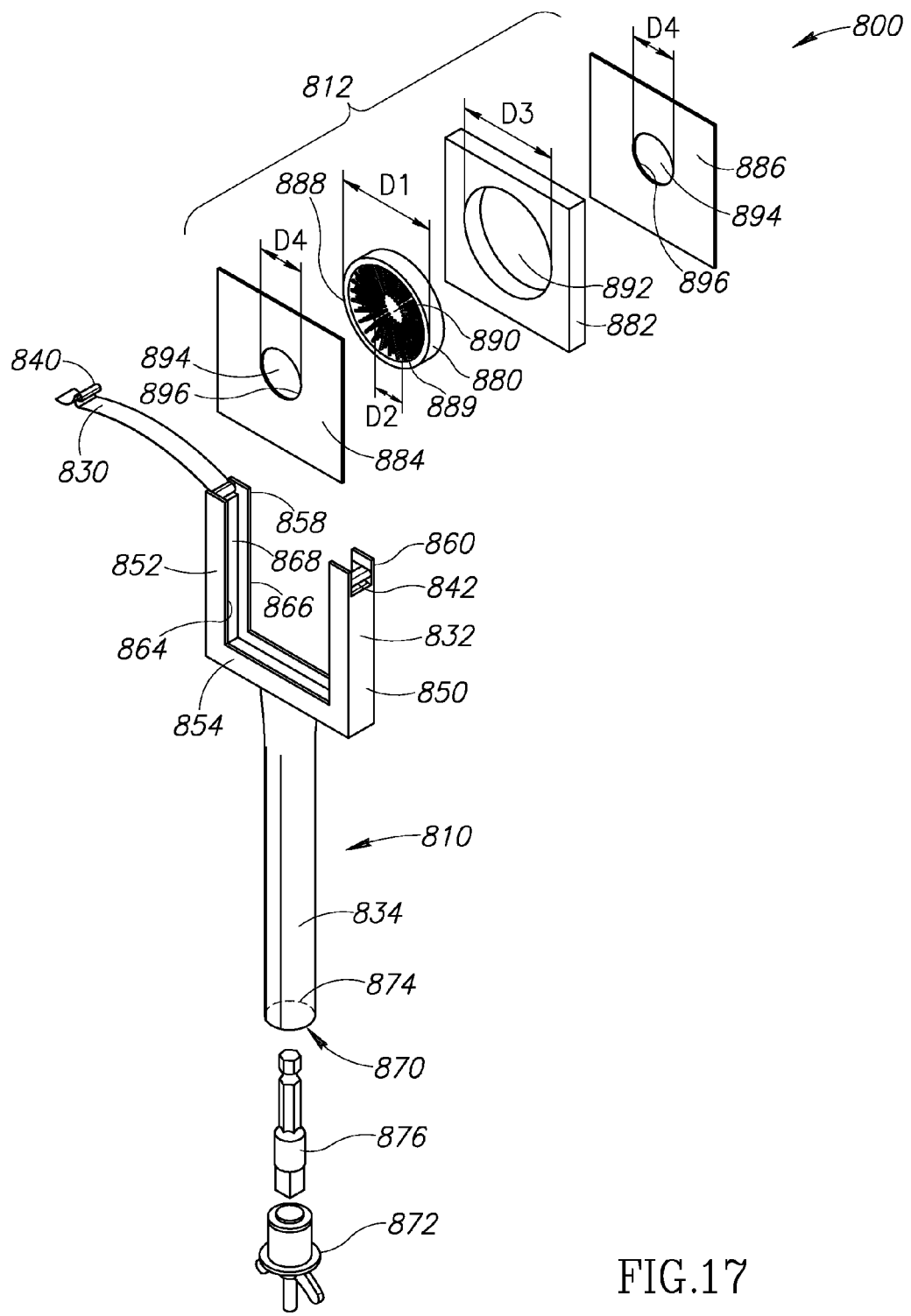
FIG. 17 is an exploded perspective view of the ninth embodiment of the bolt cleaning apparatus.
Figure 18:
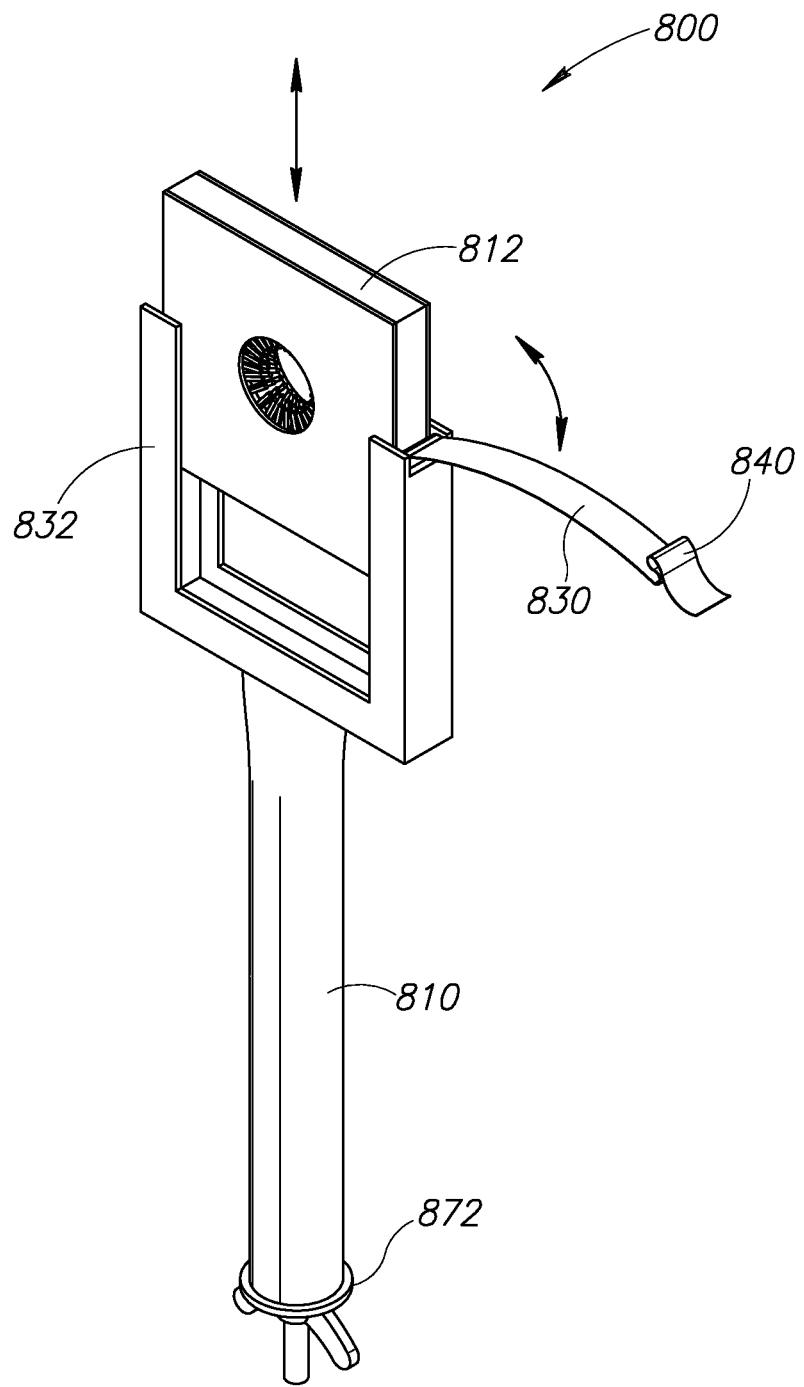
FIG. 18 is a third perspective view of the ninth embodiment of the bolt cleaning apparatus depicted with its removable insert partially removed.

Referring to FIG. 17, the base portion 810 has a locking member 830, an insert receiving portion 832, and a handle portion 834. The locking member 830 is pivotably connected to the insert receiving portion 832. The locking member 830 is pivotable between an open position (depicted in FIGS. 17 and 18), and a closed position (depicted in FIGS. 15 and 16). When in the closed position, the locking member 830 prevents the insert 812 from being inserted into or removed from the insert receiving portion 832. On the other hand, when the locking member 830 is in the open position, the insert 812 may be inserted into or removed from the insert receiving portion 832. The locking member 830 has a male connector portion 840 configured to engage a female connector portion 842 of the insert receiving portion 832.

The insert receiving portion 832 is generally U-shaped having a first upright arm 850 spaced apart from a second upright arm 852. The first and second upright arms 850 and 852 are connected together by a transverse portion 854. The locking member 830 is pivotably connected to a free end portion 858 of the second upright arm 852. The female connector portion 842 is positioned on a free end portion 860 of the first upright arm 850.

The insert receiving portion 832 has a pair of spaced apart rails 864 and 866 that extend inwardly from the first upright arm 850, the second upright arm 852, and the transverse portion 854. A generally U-shaped channel 868 is defined between the rails 864 and 866. The rails 864 and 866 are spaced apart such that the insert 812 may be slidably received therebetween.

When the locking member 830 is in the open position (see FIGS. 17 and 18) the insert 812 may be slid between the rails 864 and 866 and receiving inside the channel 868. Then, the locking member 830 may be pivoted to the closed position (see FIGS. 15 and 16), and the male connector portion 840 latched to the female connector portion 842, to maintain the insert 812 inside the insert receiving portion 832. Whenever desired, the male connector portion 840 may be unlatched from the female connector portion 842, and pivoted into the open position (see FIGS. 17 and 18). Then, the insert 812 may be removed from the channel 868 and optionally replaced with a different insert.

The handle portion 834 is configured to be gripped and held by the user 10 (see FIG. 1). Optionally, the handle portion 834 may be held by a tool (such as a vise, clamp, and the like) when the apparatus 800 is used. The handle portion 834 may have an open ended hollow interior portion 870 and a removable end cap 872 configured to be received inside an opening 874 into the hollow interior portion 870 to close the opening 874. One or more tools (e.g., a bit 876) may be stored inside the hollow interior portion 870. The end cap 872 may be selectively removed from the opening 874 to insert the tool(s) (e.g., a bit 876) into the hollow interior portion 870 of the handle portion 834 and/or remove the tool(s) from the hollow interior portion 870 of the handle portion 834. Then, the end cap 872 may be used to close the opening 874 to store the tool(s) (e.g., a bit 876) inside the hollow interior portion 870 of the handle portion 834.

The insert 812 includes a cleaning member 880, an intermediate portion 882, a first cover plate 884, and a second cover plate 886. In the embodiment illustrated, the cleaning member 880 has been implemented as a generally cylindrically shaped card clothing member. The cleaning member 880 includes a generally cylindrically shaped base portion 888 having a first outer diameter "D1." Projections 889 (e.g., pins, bristles, and the like) extend inwardly from the base portion 888. The projections 889 may extend only a predetermined distance to define a central through passage

890 having a second diameter "D2." The second diameter "D2" is smaller than the first diameter "D1." The second diameter "D2" may be smaller than the major diameter "$D_{MAJ}$" (see FIG. 3) of the threaded portion 34 of the bolt 30 so that the projections 889 will rub and/or scrape against the threads 36 to remove debris therefrom.

The intermediate portion 882 has an aperture 892 configured to receive the cleaning member 880. In the embodiment illustrated, the aperture 892 is generally circular and has a third diameter "D3" approximately equal to or larger than the first diameter "D1." The intermediate portion 882 may be constructed from any suitable material, such as plastic (e.g., Ptex, nylon), metal, and the like.

The first cover plate 884 is substantially identical to the second cover plate 886. Each of the first and second cover plates 884 and 886 has a through hole 894 configured to be aligned with the through passage 890 of the cleaning member 880 when the cleaning member 880 is received inside the aperture 892 of the intermediate portion 882. In the embodiment illustrated, each of the through holes 894 has a generally circular perimeter 896 having a fourth diameter "D4" that is less than the first diameter "D1," and larger than the second diameter "D2" of the cleaning member 880.

The cleaning member 880 is positioned inside the aperture 892 of the intermediate portion 882 between the first and second cover plates 884 and 886. The intermediate portion 882 is sandwiched in between the first and second cover plates 884 and 886 with the through holes 894 of the first and second cover plates 884 and 886 aligned with the aperture 892 of the intermediate portion 882, and the through passage 890 of the cleaning member 880. Thus, the open-ended through passage 890 is accessible through the first and second cover plates 884 and 886. Further, the first and second cover plates 884 and 886 trap the cleaning member 880 inside the aperture 892, and prevent the cleaning member 880 from being removed from the aperture 892. Each of the first and second cover plates 884 and 886 may be constructed from any suitable material, such as plastic (e.g., Plexiglas), metal, and the like. In the embodiment illustrated, the first and second cover plates 884 and 886 are each constructed from an opaque material. However, this is not a requirement.

Optionally, fasteners (not shown) may be used to fasten the first and second cover plates 884 and 886 to the intermediate portion 882 with the cleaning member 880 positioned inside the aperture 892. Such fasteners may be implemented as bolts, screws, and the like. In alternate embodiments, the first and second cover plates 884 and 886 may be attached to the intermediate portion 882 in another manner, such as by welding, an adhesive, and the like.

The apparatus 800 is used in a manner substantially identical to the manner in which the apparatus 20 is used. For example, the rotary power tool 31 (see FIGS. 1 and 2), a manual tool (not shown), or the hand of the user 10 (see FIG. 1), may be used to rotate the bolt 30 inside the through passage 890 of the cleaning member 880. By way of yet another non-limiting example, the apparatus 800 may be rotated about the bolt 30 as the bolt is maintained inside one of the through passage 890. To clean the threads 36 (see FIG. 2), the projections 889 extend radially inwardly beyond the perimeters 896 of the through holes 894. By way of a non-limiting example, the projections 889 extend radially inwardly beyond the perimeters 896 of the through holes 894 by a distance equal to or greater than the thread height "H" (see FIG. 3). By way of another non-limiting example, the projections 889 extend radially inwardly beyond the perimeters 896 of the through holes 894 by a distance that is at least two to three times the thread height "H."

As the threaded portion 36 encounters the projections 889 of the cleaning member 880, the projections 889 remove debris from the external threads 36 thereby cleaning the bolt 30. All or a portion of the threaded portion 34 of the bolt 30 may be inserted into, rotated therein, and removed from the through passage 890 a selected number of times to clean the bolt 30. For example, the threaded portion 34 of the bolt 30 may be inserted into the through passage 890, rotated therein, and passed through the cleaning member 880. When the entire length of the rotating threaded portion 34 of the bolt 30 has passed through the cleaning member 880, the rotating threaded portion 34 may be withdrawn from the through passage 890, which passes the threaded portion 34 through the cleaning member 880 a second time. If desired, a portion of the threaded portion 34 of the bolt 30 may be maintained in a stationary position inside the through passage 890 as the bolt is rotated to clean a portion of the bolt 30 more thoroughly.

The bolt cleaning apparatuses 20, 120, 220, 320, 420, 520, 620, 720, and 800 may each be used to clean bolts having threaded portions with a range of outer diameters and any length. The apparatuses 20, 120, 220, 320, 420, 520, 620, 720, and 800 may each be implemented as a light weight and compact tool that can be held in the hand of the user 10 hand and/or by a tool (such as a vise, clamp, and the like). The apparatuses 20, 120, 220, 320, 420, 520, 620, 720, and 800 may each provides a safe alternative to using a bench grinder to rotate a wire wheel. The apparatuses 20, 120, 220, 320, 420, 520, 620, 720, and 800 may each be used by hobbyists working at home, or professional mechanics working in large automotive shops. Using the apparatuses 20, 120, 220, 320, 420, 520, 620, 720, and 800 requires little to no training, and, therefore, may save companies money when compared to using bench grinders to clean bolts.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An apparatus for cleaning a plurality of bolts each having a threaded portion with a different outer diameter, the apparatus comprising:
   a handle;
   a bolt receiving portion connected to the handle, the bolt receiving portion having a plurality of throughways, each throughway being configured to receive the threaded portion of at least one of the plurality of bolts along a longitudinal axis of rotation, both the bolt receiving portion and the handle extending laterally with respect to the longitudinal axis of rotation of each of the plurality of throughways; and
   a cleaning member comprising a plurality of cleaning projections, the cleaning member being substantially stationary with respect to the bolt receiving portion, the cleaning member being positioned such that a portion of the plurality of cleaning projections contact the threaded portion of a selected one of the plurality of bolts when the threaded portion of the selected bolt is inserted inside a selected one of the plurality of throughways along the longitudinal axis of rotation of the selected throughway.

2. The apparatus of claim 1, further comprising:
   a body assembly comprising the bolt receiving portion, the body assembly further comprising a first body portion attached to a second body portion with the cleaning member positioned between the first and second body portions.

3. The apparatus of claim 1, wherein the plurality of cleaning projections comprise a plurality of bristles or a plurality of pins.

4. The apparatus of claim 1, wherein the plurality of cleaning projections extend laterally part way into the plurality of throughways, the portion of the plurality of cleaning projections extending laterally part way into the selected throughway.

5. The apparatus of claim 4, wherein the bolt receiving portion comprises an aperture configured to house the cleaning member.

6. The apparatus of claim 5, further comprising a first cover plate and a second cover plate, wherein the first cover plate is coupled to a first side portion of the bolt receiving portion and extends across the aperture,
   the second cover plate is coupled to a second side portion of the bolt receiving portion and extends across the aperture, and
   the first cover plate and the second cover plate trap the cleaning member inside the aperture.

7. The apparatus of claim 1, wherein the plurality of cleaning projections comprise a plurality of bristles, and the cleaning member is a wire wheel comprising the plurality of bristles, wherein the bolt receiving portion comprises an aperture configured to house the wire wheel,
   the aperture has a perimeter, and
   the plurality of throughways are arranged about and overlap the perimeter of the aperture such that the plurality of bristles extend laterally part way into the plurality of throughways with the portion of the plurality of bristles extending laterally part way into the selected throughway.

8. The apparatus of claim 7, wherein the plurality of throughways arranged about and overlapping the perimeter of the aperture are spaced apart from one another, and
   interstitial portions of the bolt receiving portion located between adjacent ones of the plurality of throughways contact the wire wheel and help prevent the wire wheel from moving laterally inside the aperture.

9. The apparatus of claim 1, further comprising a body portion comprising the handle, the bolt receiving portion being removably couplable to the body portion.

10. The apparatus of claim 9, wherein the body portion comprises a latch member configured to selectively lock the bolt receiving portion to the body portion.

11. An article for cleaning a bolt having a threaded portion with a longitudinal axis of rotation, the article comprising:
   a body with a bolt receiving portion connected to a handle, the bolt receiving portion comprising a first body portion attached to a second body portion, the bolt receiving portion having a throughway configured to receive the threaded portion of the bolt when the threaded portion is rotating about the longitudinal axis of rotation, the handle extending laterally from the bolt receiving portion with respect to the longitudinal axis of rotation; and
   a wire wheel housed inside the bolt receiving portion between the first and second body portions, the wire wheel being substantially stationary with respect to the bolt receiving portion, the wire wheel having a plurality of bristles positioned to contact and clean the threaded portion of the bolt when the threaded portion of the bolt passes through the throughway rotating about the longitudinal axis of rotation.

12. An article for cleaning a bolt having a threaded portion with a longitudinal axis of rotation, the article comprising:
   a body with a bolt receiving portion connected to a handle, the bolt receiving portion having an aperture and a throughway, the throughway being configured to receive the threaded portion of the bolt when the threaded portion is rotating about the longitudinal axis of rotation, the handle extending laterally from the bolt receiving portion with respect to the longitudinal axis of rotation;
   a wire wheel housed inside the aperture of the bolt receiving portion, the wire wheel being substantially stationary with respect to the bolt receiving portion, the wire wheel having a plurality of bristles positioned to contact and clean the threaded portion of the bolt when the threaded portion of the bolt passes through the throughway rotating about the longitudinal axis of rotation;

a first cover plate coupled to a first side portion of the bolt receiving portion, the first cover plate extending across the aperture; and a second cover plate coupled to a second side portion of the bolt receiving portion, the second cover plate extending across the aperture, the first cover plate and the second cover plate trapping the wire wheel inside the aperture.

13. The article of claim 12, further comprising:

a fastener passing through the first cover plate, the wire wheel, and the second cover plate, the fastener helping to maintain the wire wheel inside the aperture.

\* \* \* \* \*